(12) United States Patent
Larumbe

(10) Patent No.: US 6,212,993 B1
(45) Date of Patent: Apr. 10, 2001

(54) VACUUM BRAKE BOOSTER

(75) Inventor: Isabel Larumbe, Baranain (ES)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/507,061

(22) Filed: Feb. 18, 2000

Related U.S. Application Data

(63) Continuation of application No. PCT/EP97/04594, filed on Aug. 22, 1997.

(51) Int. Cl.$^7$ ....................................................... F15B 9/10
(52) U.S. Cl. .................................................... 91/369.3
(58) Field of Search ............................... 91/369.2, 369.3, 91/376 R

(56) References Cited

U.S. PATENT DOCUMENTS

| | | | |
|---|---|---|---|
| 4,350,076 | * | 9/1982 | Thiel .................................. 91/376 R |
| 4,718,326 | | 1/1988 | Sugiura et al. .................... 91/376 R |
| 5,564,326 | * | 10/1996 | Gautier et al. ..................... 91/376 R |

FOREIGN PATENT DOCUMENTS

| | | |
|---|---|---|
| 2918734 C2 | 11/1989 | (DE) . |
| 9005629 U 1 | 5/1990 | (DE) . |
| 3924672 | 1/1991 | (DE) . |
| 173338 B1 | 3/1988 | (EP) . |
| 2258022 | 1/1993 | (GB) . |

* cited by examiner

*Primary Examiner*—F. Daniel Lopez
(74) *Attorney, Agent, or Firm*—MacMillan, Sobanski & Todd, LLC

(57) ABSTRACT

A vacuum brake booster (10) has a control valve housing (30) for a control valve (28) actuated by a bar shaped input member (34). A guide sleeve (42) is secured to the control valve housing and has a slot (68) aligned with a vent duct (62) in the control valve housing. A sensing plunger (36) is axially slidable in the guide sleeve by the input member, and a transversely extending stop bar (66) is fixed to the sensing plunger. The stop bar extends through the slot of the guide sleeve and into the vent duct. To improve flow through the vent duct, edges of the slot form axial stops for the stop bar, so that the axial extension of the slot defines the maximum stroke of the sensing plunger. Where the stop bar extends into the vent duct, the vent duct is obliquely oriented towards a working chamber (26), and has an axial extension considerably larger than that of the slot.

9 Claims, 2 Drawing Sheets

VACUUM BRAKE BOOSTER

CROSS REFERENCE TO RELATED APPLICATIONS

This application is a continuation of International Application No. PCT/EP97/04594 filed Aug. 22, 1997.

The invention relates to a vacuum brake booster for a hydraulic vehicle braking system. A vacuum brake booster of this type is known from EP-B-0 173 333.

BACKGROUND OF THE INVENTION

Brake boosters of said type are nowadays employed as large-scale production products for the amplification of the actuation force which is applied by the driver of a vehicle to the brake pedal during a braking operation. An input member of the brake booster, which is connected to the brake pedal, transmits the actuation force applied by the driver to the brake booster which amplifies said force and supplies it via an output member to a downstream master cylinder which is connected to the brake booster.

The brake booster is to respond as directly as possible to a variation of the actuation force exerted by the driver and correspondingly increase or decrease, respectively, the force assistance. This means that the air volume which is required for venting the working chamber of the brake booster must be supplied as rapidly as possible. Due to the rapidly incoming air undesired noise may occur, and it is known to reduce this noise to an extent which no longer constitutes a disturbance by means of sound-absorbing material, for example in the form of a sound-absorbing liner (see also DE-B-29 18 734).

SUMMARY OF THE INVENTION

The invention is based on the object to provide a vacuum brake booster the working chamber of which can be vented as rapidly as possible without being provided with sound-absorbing material and without the occurrence of disturbing noise.

According to the invention, the vent duct in the control valve housing is therefore not used to mechanically limit the stroke of the sensing piston which is displaced by the input member, as is common in the state of the art, but rather at least the edge of the slot provided in the guide sleeve for the sensing piston which is closer to the master cylinder is used as a stop for the stop bar. This enables the vent duct to have a significantly larger axial extension in that area where the stop bar protrudes through the slot of the guide sleeve into the vent duct as compared to the axial extension of the slot. In one embodiment of a brake booster according to the invention, the stop for the stop bar, which determines the rest position of the sensing piston, i.e. the position which the sensing piston assumes when the brake booster is not actuated, is formed by an inner shoulder of the brake booster housing. When the brake booster is actuated, however, the axial extension of the slot in the guide sleeve defines the maximum possible stroke of the sensing piston in that the, in the axial direction, front and rear edges of the slot form one stop each for the stop bar which is securely connected to the sensing piston and protrudes through the slot.

According to the invention, the vent duct thus no longer fulfils a mechanical stop function but only serves to route the air and can therefore be better optimised in this respect. In particular, the cross-section of the vent duct in that area into which the stop bar protrudes is selected much larger than hitherto usual which reduces the flow rate and thus the noise generation during the flow. In addition, the larger axial dimension of the vent duct in the mentioned area makes it possible to orient this area of the vent duct obliquely towards the working chamber, which results in a less defined deflection of the air flowing in coaxially with the input member and, as a consequence thereof, in a less defined whirling as well as simultaneously in the generation of less noise. The above-mentioned measures also provide for a discernible reduction of the pressure loss of the vent duct which leads to an improved flow through same and thus to an improved response of the brake booster to variations of the actuating force.

In a preferred embodiment of the brake booster according to the invention the control valve housing is made of plastic material and the guide sleeve is made of metal. A control valve housing made of plastic material can be manufactured economically, for example by injection moulding, while the guide sleeve made of metal as an insert of simple design for receiving the sensing piston ensures the required good dimensional accuracy and a high wear resistance. Advantageously, the guide sleeve comprises a collar which is oriented essentially radially outwardly, by means of which the guide sleeve is anchored in the control valve housing. It is particularly advantageous to have this collar coated with plastic material which can easily be achieved by inserting the guide sleeve into the mould for the control valve housing at an appropriate location prior to injection moulding. Alternatively, the collar can be adhered to, melted with the control valve housing, or attached to same in another manner.

In order to further improve the flow through the vent duct, according to a preferred embodiment of the brake booster according to the invention, an essentially funnel-shaped narrowing air guiding element is arranged coaxially with the input member in the air inlet area of the vent duct, which element bears upon a shoulder of the input member. The support of the air guiding element on a shoulder of the input member renders a separate support unnecessary. The air guiding element directs the air flowing into the vent duct to the valve seats of the control valve and thus prevents unnecessary deflections; of the air stream with the resulting eddy and noise generation.

In a constructively advantageous manner the air guiding element is urged by a spring against the shoulder formed at the input member and is thus securely positioned, which spring simultaneously serves to return the input member to the initial position after termination of a brake booster actuation.

In one embodiment the air guiding element is penetrated by a series of flow openings which taper conically in the flow direction and extend obliquely towards the main axis (centre longitudinal axis) of the brake booster. The flow openings are arranged equidistantly to each other in the circumferential direction of the air guiding element. Such a configuration of the air guiding element offers, while providing high stability, a large flow cross-section and thus a relatively low flow resistance.

DETAILED DESCRIPTION OF THE PREFERRED EMBODIMENT

Figure 1:
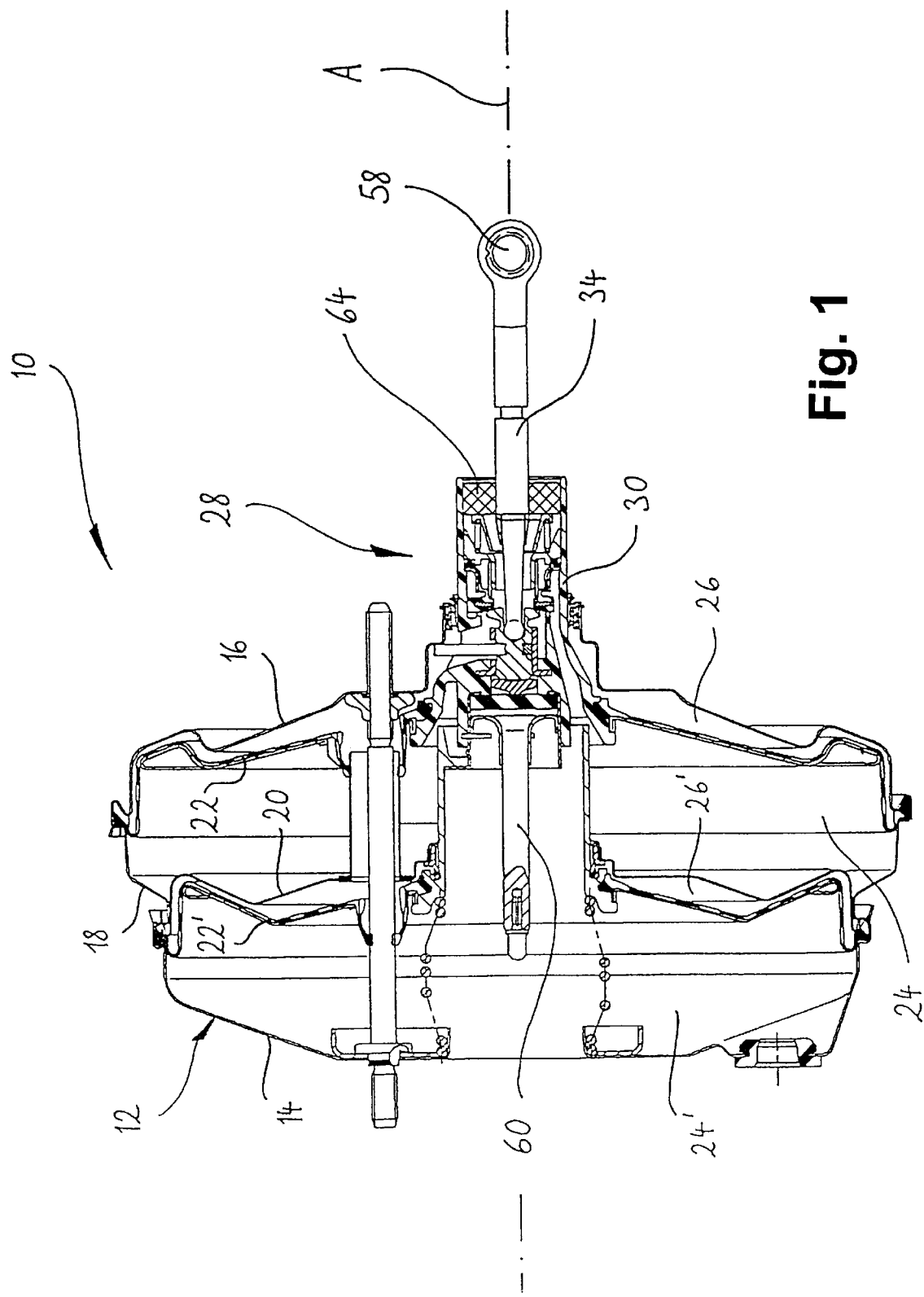
FIG. 1 shows a longitudinal section through an embodiment of a vacuum brake booster according to the invention.

In FIG. 1 a vacuum brake booster of the tandem design, generally identified by 10, is shown which is to be connected to a master cylinder (not shown).

The brake booster 10 comprises an essentially rotationally symmetrical housing 12 with two shell-shaped outer housing walls 14 and 16. The two housing walls 14 and 16 are connected to each other by a central housing part 18 which forms the central part of the circumferential wall of the brake booster housing 12. A stationary inner housing wall 20 which divides the inner space of the brake booster housing 12 provides the prerequisite for two braking force amplification stages (tandem design) arranged in the housing 12.

Each of the two cavities formed by the inner housing wall 20 in the brake booster housing 12 is divided by one gas-tight and axially movable wall 22, 22' each into a vacuum chamber 24, 24' and a working chamber 26, 26' each. In the operating state of the brake booster 10 the vacuum chambers 24, 24' are constantly connected to a vacuum source, for example to the intake system of a combustion engine, while the working chambers 26, 26' may optionally be connected to the vacuum source or at least to atmospheric pressure. For this purpose a control valve 28 is provided, the housing 30 of which here is a plastic injection moulded part being connected to the movable walls 22, 22' for a common relative movement with respect to the brake booster housing 12.

Figure 2:
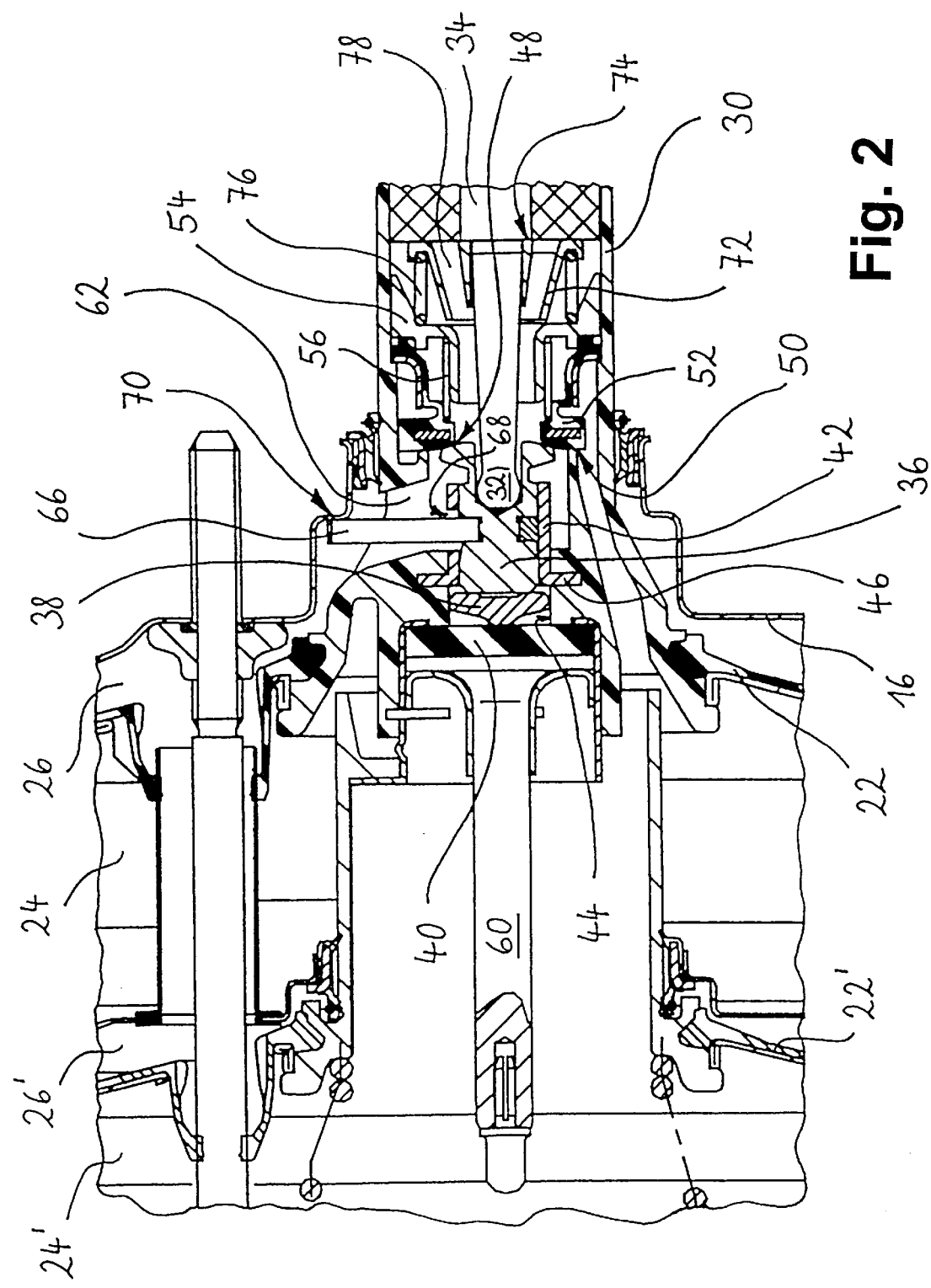
FIG. 2 shows a cut-out of FIG. 1 particularly featuring the control valve in an enlarged illustration.

As can be better seen in FIG. 2, the end 32, which, in the illustrated example, is spherical, of an essentially bar-shaped input member 34 by which the actuating force of a user is introduced initiating an actuation of the brake booster 10 acts upon the control valve 28.

The spherical end 32 of the input member 34 is received in an end section of an axially displaceable sensing piston 36 which extends as an axial extension of the input member 34 along a main axis A, and the other end of which is in contact with a rubber-elastic reaction disc 40 via a sensing disc 38, which is received in a face end recess in the control valve housing 30. The sensing piston 36 in turn is received in a guide sleeve 42 which is here made of metal and which is anchored in a passage 44 of the control valve housing 30 by means of a coated collar 46 projecting radially outwardly from same.

At the end of the sensing piston 36 facing the input member 34 an annular first valve seat 48 is formed which together with a second annular valve seat 50 which is formed adjacent to the first valve seat 48 radially externally at a housing part of the control valve housing 30 and together with a valve closing member 52, provides for the valve function of the control valve 28. The valve closing member 52 is urged against the two valve seats 48 and 50 by means of a compression spring 56 which bears upon a holder 54.

In order to initiate a braking operation the driver of a vehicle exerts an actuating force onto the input member 34 via a brake pedal (not shown), which is pivotably connected at 58 (see FIG. 1) to the input member 34, resulting in a displacement of same along the axis A into the brake booster housing 12. The sensing piston 36 which is in engagement with the input member 34 transmits this actuating force by means of the sensing disc 38 to the rubber-elastic reaction disc 40 from where the actuating force is further transmitted via a power output member 60 having a T-shaped cross-section, which is retained in the face end recess of the control valve housing 30, to the already mentioned master cylinder (not shown).

The just described displacement of the input member 34 causes the first valve seat 48, which is formed at the sensing piston 36, to be lifted off the valve closing member 52 whereby a vent duct 62 is opened which, beginning with a filter 64, at first extends coaxially surrounding the input member 34, then passes the first valve seat 48 and finally extends obliquely towards the working chamber 26. Via this vent duct 62 the working chamber 26 with the first valve seat 48 lifted off from the valve closing member 52 is connected to atmospheric pressure, whereupon the pressure difference between the working chamber 26 and the vacuum chamber 24, which is now building up at the movable wall 22, causes a displacement of the movable wall 22 to the left. Since the movable wall 22 is firmly connected to the control valve housing 28, also the control valve housing 28 is moved to the left, i.e. into the brake booster housing 12, and in this manner transmits an additional actuating force to the reaction disc 40 and thus to the force output member 60. This function of the control valve 28 as well as the reverse function sequence taking place after completion of an actuating operation is well known to those skilled in the art and, therefore, needs not be explained in further detail.

In order to define the stroke of the sensing piston 36 an elongate stop bar 66 which is firmly connected thereto is provided which extends transversely to the main axis A through a slot 68 provided in the guide sleeve 42 and into the vent duct 62 as shown. In the rest position of the brake booster 10, as shown in the figures, the stop bar 66 with its free end abuts an inner shoulder 70 of the brake booster housing 12 and thus defines the initial position of the input member 34 and of the first valve seat 48. During operation the axial extension of the slot 68 in the guide sleeve 42, i.e. the extension of the slot 68 along the main axis A, defines the maximum possible stroke of the sensing piston 36 since the stop bar 66 which is coupled to the sensing piston 36 abuts the front or rear edge of the slot 68 after having travelled through the corresponding stroke, so that any further displacement of the sensing piston 36 relative to the control valve housing 30 is prevented.

In the area where the stop bar 66 protrudes into the vent duct 62 the latter has a significantly larger axial extension compared to the slot 68 and is additionally oriented obliquely towards the working chamber 22 (see FIG. 2). The oblique extension of the vent duct 62 and its large flow cross-section in said area provides for a supply of the air flowing through the vent duct 62 into the working chamber 26 which is less disturbed and has lower pressure losses, whereby a reduced noise generation is achieved in addition to a more rapid response of the brake booster 10 to variations of the actuating force.

In order to further improve the guidance of the air flow through the vent duct 62 an air guiding element 72 with a funnel-shaped cross-section is provided in the inlet area of the vent duct 62 downstream of a filter 64, which bears against a shoulder 74 of the air input member 34, against which it is pressed by means of a spring 76 which with its one end bears against the holder 54 and with its opposite other end bears against the air guiding member 72. The spring 76 serves to return the input member 34 to its initial position when an actuation operation of the brake booster 10 is terminated.

The air guiding element 72 comprises a series of flow openings 78 which are arranged equidistantly to each other in the circumferential direction, which taper conically in the flow direction and extend obliquely relative to the main axis A so that the passing air is essentially directed immediately against the valve seats 48 and 50 without being deflected in an undesired manner.

What is claimed is:

1. A vacuum brake booster for a hydraulic vehicle braking system, having a two-part housing which comprises two outer housing walls opposite each other and at least one movable wall which divides an inner space of the housing into a vacuum chamber and a working chamber, and a control valve which is actuated by means of a bar-shaped input member, a control valve housing for the control valve is connected with the movable wall for a common relative movement with respect to the brake booster housing for the optional connection of the working chamber to at least atmospheric pressure, with a sensing piston being arranged in the control valve, which piston is axially displaceable along a main axis (A) by means of the input member and is received in a guide sleeve secured in the control valve housing and firmly connected with a stop bar which extends transversely to the main axis (A) and protrudes from the guide sleeve through a slot provided therein radially outwardly into a vent duct of the control valve housing, which connects the working chamber to at least atmospheric pressure when a first valve seat of the control valve, which is formed at the sensing piston, is open, characterised in that edges of the slot provided in the guide sleeve form stops for an axial displacement of the stop bar in such a manner that the axial extension of the slot defines the maximum possible stroke of the sensing piston and in that the vent duct has an axial extension in the entire area where the stop bar protrudes into said duct which is considerably larger than the axial extension of the slot so that the flow rate in the mentioned area is reduced.

2. The brake booster according to claim 1, characterised in that the vent duct is oriented obliquely towards the working chamber in that area where the stop bar protrudes into said vent duct.

3. The brake booster according to claim 1, characterised in that the control valve housing is made of plastic material and the guide sleeve is made of metal.

4. The brake booster according to claim 3, characterised in that the guide sleeve comprises a collar directed essentially radially outwardly which anchors the guide sleeve in the control valve housing.

5. The brake booster according to claim 4, characterised in that the collar is coated with the plastic material of the control valve housing.

6. The brake booster according to claim 1, characterised in that an essentially funnel-shaped tapering air guiding element is arranged coaxially with the input member in the air inlet area of the vent duct, which element bears against a shoulder of the input member.

7. The brake booster according to claim 6, characterised in that the air guiding element is urged against the shoulder by a spring.

8. The brake booster according to claim 6, characterised in that the air guiding element is penetrated by a series of flow openings which conically taper in the flow direction and extend obliquely towards the main axis (A).

9. The brake booster according to claim 7, characterised in that the air guiding element is penetrated by a series of flow openings which conically taper in the flow direction and extend obliquely towards the main axis (A).

* * * * *